April 3, 1928.                                           1,664,535
M. BARTHOLDY
METHOD OF TESTING TAPER HOLES
Filed Jan. 4, 1926
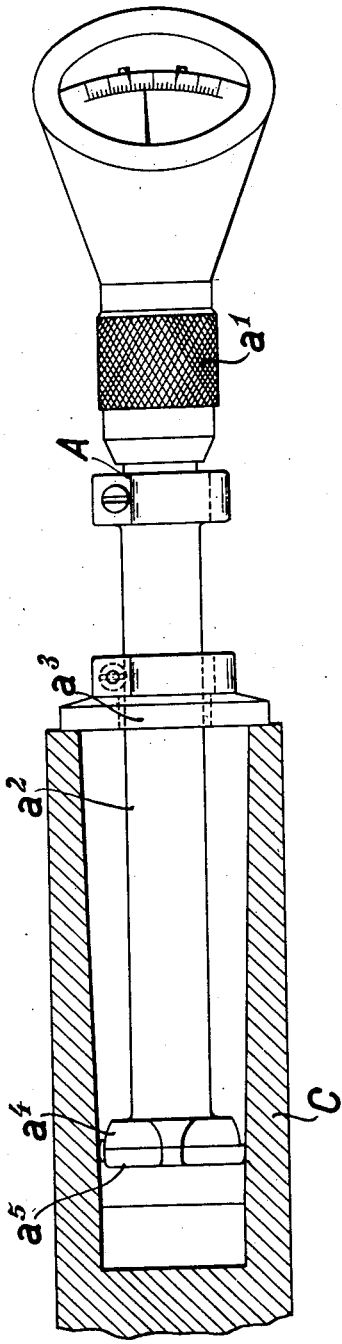
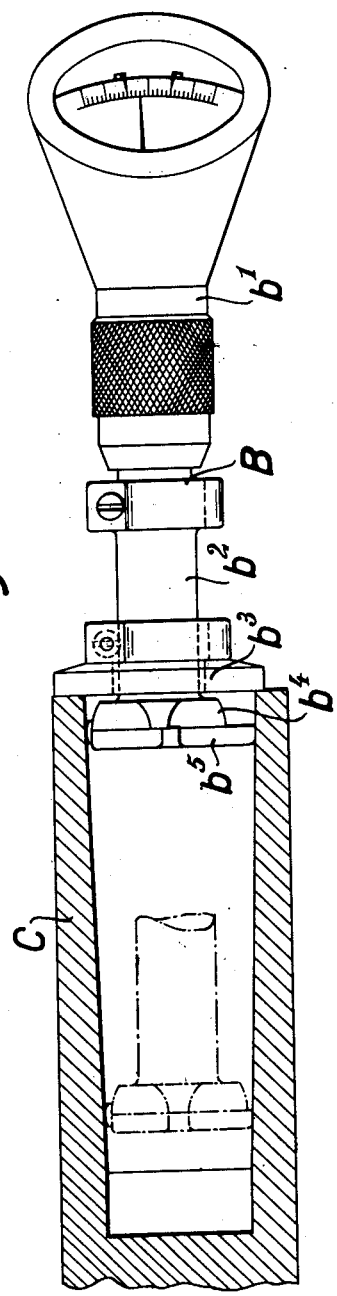
Inventor
Max Bartholdy Patented Apr. 3, 1928.

1,664,535

UNITED STATES PATENT OFFICE.

MAX BARTHOLDY, OF ESSEN, GERMANY, ASSIGNOR TO FRIED. KRUPP AKTIEN-GESELLSCHAFT, OF ESSEN-ON-THE-RUHR, GERMANY.

METHOD OF TESTING TAPER HOLES.

Application filed January 4, 1926, Serial No. 79,222, and in Germany September 5, 1925.

The invention relates to a method of testing taper holes and has for its object to permit of the testing being performed in a particularly quick and reliable manner. The method is particularly applicable to the testing of a large quantity of taper holes according to a single standard piece.

On the drawing are illustrated two gages as used in carrying out the method to be described hereinafter, in connection with a comparison piece in longitudinal section.

The one of the gages used is a hole gage A, Fig. 1, having an indicator $a^1$ for fine indication and a comparatively long stem $a^2$. The latter carries a stop piece $a^3$ adapted to be shifted along and fixed on said stem $a^2$. On its free end the stem $a^2$ has a head $a^4$ which carries, in a manner known per se, an interchangeable feeling plate $a^5$ the feeling plate may be constructed in the manner shown in Patent No. 1,048,073. As shown in Fig. 2, a second hole gage B is further used for carrying out the present testing method, this gage B having likewise an indicator, $b^1$, for fine indication and a stop piece $b^3$, and differing from the gage A merely by its stem $b^2$-being shorter than the stem $a^2$ and its feeling plate $b^5$, mounted on the head $b^4$, having a greater diameter.

In conformity with the present invention taper holes are tested by testing two different diameters thereof. One of the hole gages, e. g. gage A, which serves to test the smaller one of the two diameters, is introduced in the taper hole of a comparison piece C with its head $a^4$ until the indicator $a^1$ indicates zero. Thereupon the stop piece $a^3$ is shifted on the stem $a^2$ so as to abut against the front face of the piece C and is fixed in this position on stem $a^2$. In an analogous manner the gage B, serving to test the second, greater, diameter of the taper hole, is adjusted by means of the comparison piece C. When now successively introduced in the taper hole to be tested, the said two gages permit of deviations in diameter, if any, being read-off by the indicators $a^1$ and $b^1$ without any further ado. It is not necessary to take the measurements at any determined distance apart because it is only necessary to determine how the piece to be tested compares with the comparison piece.

I claim:

The method of testing a plurality of taper holes by means of adjustable hole gages adapted to indicate variations from measurements for which they are set and having adjustable stops for limiting the extent of their projection into a hole, which consists in setting one such gage in accordance with the diameter of a comparison piece at one transverse plane, and adjusting its stop to correspond with such plane, setting another such gage in accordance with the diameter of said comparison piece at another transverse plane and correspondingly adjusting its stop, and then successively introducing each of said gages into the taper holes to be tested and observing the comparative diameters indicated by said gages.

MAX BARTHOLDY.